United States Patent [19]
Wagner

[11] 3,815,513
[45] June 11, 1974

[54] VEHICLE RETAINING ARRANGEMENT FOR A MONOBEAM TYPE OF TRANSPORTATION SYSTEM

[75] Inventor: Joseph F. Wagner, North Cape May, N.J.

[73] Assignee: Westinghouse Air Brake Company, Swissvale, Pa.

[22] Filed: Oct. 6, 1972

[21] Appl. No.: 295,760

[52] U.S. Cl. .............................. 104/248, 105/216
[51] Int. Cl. ............................................. B61k 5/00
[58] Field of Search .......... 104/242, 243, 248, 120; 105/215, 216

[56] References Cited
UNITED STATES PATENTS

| | | | |
|---|---|---|---|
| 3,070,038 | 12/1962 | Toulmin | 104/242 |
| 3,333,550 | 8/1967 | Gorham | 104/120 |
| 3,602,152 | 8/1971 | Hawes | 104/120 |
| 3,710,727 | 1/1973 | Svensson | 104/120 |

Primary Examiner—M. Henson Wood, Jr.
Assistant Examiner—D. W. Keen

[57] ABSTRACT

This disclosure relates to a vehicle entrapping or retaining arrangement for a monobeam type of transportation system. The system includes an elongated roadway having a pair of horizontal surfaces straddled by a central H-shaped guide beam. The monobeam vehicles include trucks which have a plurality of supporting wheels which run on the horizontal surfaces of the roadway as well as a plurality of guide wheels which follow vertical sides of the H-shaped central guide beam. A pair of inverted furrows are formed along the upper edge of each of the vertical sides and extend the length of the central guide beam. The inverted furrows are adapted to be engaged by matching lip portions carried on the sides of the trucks so that the monobeam vehicles cannot be overturned by high velocity winds or centrifugal forces experienced in the negotiation of curves and bends in the roadway.

5 Claims, 3 Drawing Figures

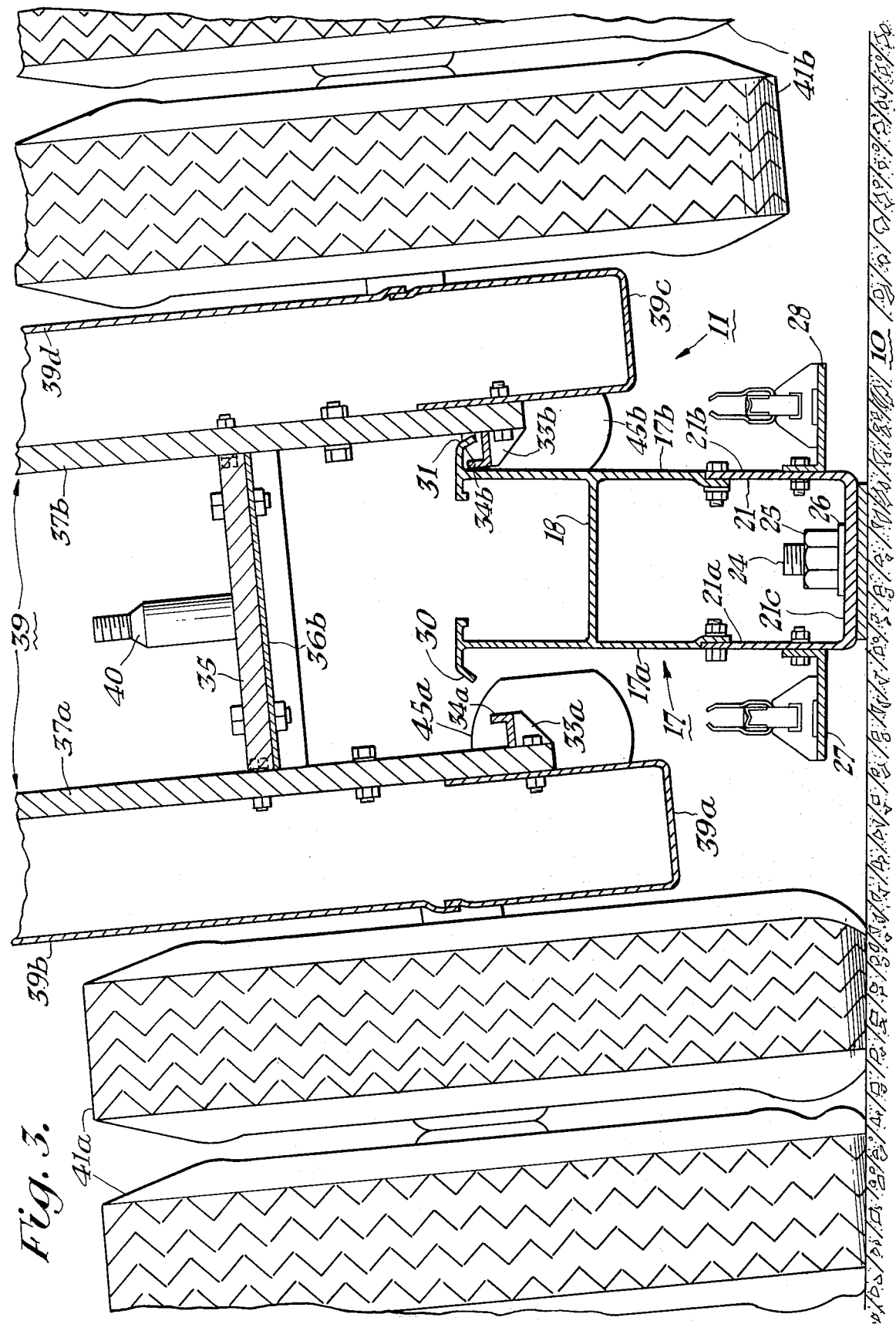

VEHICLE RETAINING ARRANGEMENT FOR A MONOBEAM TYPE OF TRANSPORTATION SYSTEM

This invention relates to a people moving transportation system, and more particularly to a positive retaining or entrapping arrangement for holding a monobeam type of vehicle onto a guided roadway so that internally as well as externally generated forces, such as, centrifugal thrusts and/or high velocity cross winds, are incapable of causing the monobeam vehicles to accidentally overturn or run off the guided roadway.

Each and every city and conurbation of the world is faced with the problem of effectively and efficiently transporting people from one place to another in a safe, comfortable and rapid manner. In order to alleviate the ever increasing auto congestion problems and the insurmountable traffic jams that take place in the everyday life of the traveling public, it appears necessary to supplement present automobile, bus and rail people movers with an additional suitable and acceptable mass and/or rapid transit system. The monobeam type of transportation system is gaining wide recognition as one possible kind of conveyance which is practical and capable of mitigating the problem of moving people in urban as well as in suburban areas. The monobeam utilizes a guided trackway or roadway and one, two or more married self-guiding vehicles which travel along selected routes on the guided trackway. A monobeam system is very flexible and versatile from the standpoint that it may be located below ground, such as, subway; at ground level, such as a highway; or elevated, such as an EL. Such an adaptable system allows the trackway network to be readily and easily installed with a minimum of disruption to the operation of the present conveyances and with a minimum of inconvenience to motorists as well as to bus and rail operators. Further, it will be appreciated that any proposed and accepted people mover must be smooth and safe in its operation in order to provide the highest degree of comfort and safety to the personnel operating the system as well as to the passengers using the system. The comfort aspect of any transportation system is of great importance in order to persuade the daily motorist and shopper to not use his private automobile in going to and from his place of employment or shopping area. The safeness of any transportation system is extremely important and in fact mandatory since this factor determines either the approval or the rejection by the transportation authority. It will be appreciated that an accident may be a very costly affair since injury to individuals could result in large damage judgements in a suit at court. Further, the damage to equipment of the transportation system is also costly to repair or replace. Most mishaps result in system shutdown which results in inconvenience to passengers and also causes a loss of revenue to the transit operator. The safety aspect not only must encompass the signal and control systems but also must include the vehicle and the trackway structure in order to prevent collisions between vehicles as well as to preclude derailment of the guided vehicles. The signal and control apparatus for transportation systems, such as, railroads and subway installations, is a highly sophisticated and developed art, and at the present time it is capable of operating in a fail-safe manner. Thus, this equipment may, in most cases, be readily used and easily adapted with a minimum of time and effort into a monobeam facility. Like in all guided or self-steering transportation systems the vehicles traveling on the monobeam trackway must be protected against derailments. That is, every precautionary measure should be taken in the design and manufacture of the monobeam type of the system to ensure theat the traveling vehicles are incapable of falling off or derailing, particularly, in elevated sections of the roadway. It will be appreciated that high velocity cross winds can exert excessive forces on the sides of the vehicles which can result in tipping and possibly upsetting of a vehicle. Thus, it is necessary to provide suitable restraining apparatus or means for positively retaining or holding the vehicles onto the guided trackway. In addition, the vehicle or train is exposed to centrifugal and other inertial forces as it negotiates curves or other angular portions of the guided trackway so that overturning can result if positive retaining means is not employed to protect the system against such an occurrence. While various vehicle restraining schemes have been proposed in the past, each of these proposals was possessed of certain undesirable shortcomings which normally resulted in either a high purchase price or a costly maintenance program. Previously monorail or monobeam vehicle retainers usually included moving parts which required frequent inspections and an excessive number of maintenance periods in order to prevent an undue amount of frictional wear due to the lack of lubrication. It will be appreciated that any piece of equipment or apparatus with moving elements or parts must be exceptionally well oiled, greased, or lubricated in order to prevent excessive wear which culd result in an unexpected premature failure.

Accordingly, it is an object of this invention to provide a transportation system having an elongated guided roadway employing a new and improved retaining arrangement which prevents monorail vehicles from accidentally leaving the guided roadway.

A further object of this invention is to provide a unique monobeam vehicle retainer which prevents high velocity cross winds and centrifugal forces from causing the moving vehicle from falling off the guided trackway.

Another object of this invention is to provide a monobeam transportation system having an elongated roadway which includes horizontal supporting and vertical steering portions which cooperate with the running and guide wheels of the trucks of the moving vehicles to retain the vehicles on course despite the tipping effects of the vehicles by cross winds and centrifugal forces.

Still a further object of this invention is to provide an improved entrapping mechanism which functions to maintain a monobeam vehicle on its trackway during periods of strong wind turbulences or during times that extraneous forces are exerted on the moving vehicles.

Yet a further object of this invention is to provide a unique entrapment arrangement which maintains a monobeam vehicle on the guided roadway even under severe environmental and exceptional operational conditions.

Still another object of this invention is to provide a novel people mover including an elongated roadway having a pair of horizontal supporting surfaces straddled by a raised center beam having opposed vertical surfaces and at least one monorail train having a plurality of trucks each carrying a plurality of running wheels which engage the horizontal supporting surfaces and a plurality of guide wheels which engage the vertical surfaces of the raised center beam, and a furrow formed on each vertical surface of the raised center beam which cooperates with mating hook portions mounted on the trucks to prevent the train from being derailed from the roadway.

Still another object of this invention is to provide a unique arrangement for preventing monobeam vehicles from leaving a guided roadway including a pair of retaining lips extending along the length of the guided roadway and hooks formed on each of the sides of the monobeam vehicles which engage the retaining lips when the monobeam vehicles are tilted a given amount.

Yet another object of this invention is to provide a vital type of vehicle entrapment apparatus which is economical in cost, simple in construction, easy to maintain, reliable in operation, durable in use, and efficient in service.

In accordance with the present invention, the monobeam type of transportation system includes an elongated trackway upon which monobeam vehicles move in traveling from point-to-point or station-to-station. The elongated trackway includes horizontal running and vertical guiding surfaces. Each of the monobeam vehicles includes a frame carrying a plurality of horizontally disposed axles each of which includes at least two pivotal axle assemblies or a front and back truck. Each of the trucks is equipped with dual rubber tire wheels which are run on horizontal running surfaces. The horizontal or top surface of the trackway may be fabricated from a reinforced concrete structure. A central guide beam is suitably fastened to the top surface of the trackway. The guide beam is H-shaped in cross section and is preferably constructed by suitable extrusion process. The beam is an all-aluminum structure to minimize weight and maintenance requirements. The lower legs of the H-beam are bolted at selected points to the upstanding arms of a U-shaped mounting channel. The base portion of each of the channels is bolted to the top of the trackway. The upper exterior edge of each of the upper legs of the H-shaped guide beam is formed with a continuous inverted furrow. Each of the trucks of the monobeam vehicles also includes a plurality of vertically rotatable guide wheels engaging the vertical surfaces at times to steer the vehicles along the trackway. In moving along their routes of travel, the monobeam vehicles are susceptible to lateral forces which could adversely affect the operation of the system. In order to prevent derailment by high winds and centrifugal forces, the monobeam vehicles are restrained from leaving the trackway by an entrapping arrangement. Each outer side of the frames of the trucks of the monobeam vehicles is provided with a restraining plate. The restraining plate includes a hook portion which is in overlapping relationship with the inverted furrows so that the tilting of the vehicles by extraneous forces causes engagement between a hook portion and an inverted furrow, thereby positively preventing the vehicles from leaving the trackway.

Further objects, features and advantages of my invention will become more readily apparent from the following description when considered in conjunction with the illustrative embodiment as shown in the drawings in which:

FIG. 3 is a cross sectional view similar to that of FIG. 2 illustrating the position of the truck assembly as it is lifted from the roadway when excessive amount of lateral forces is exerted on the monobeam vehicle.

Figure 1:
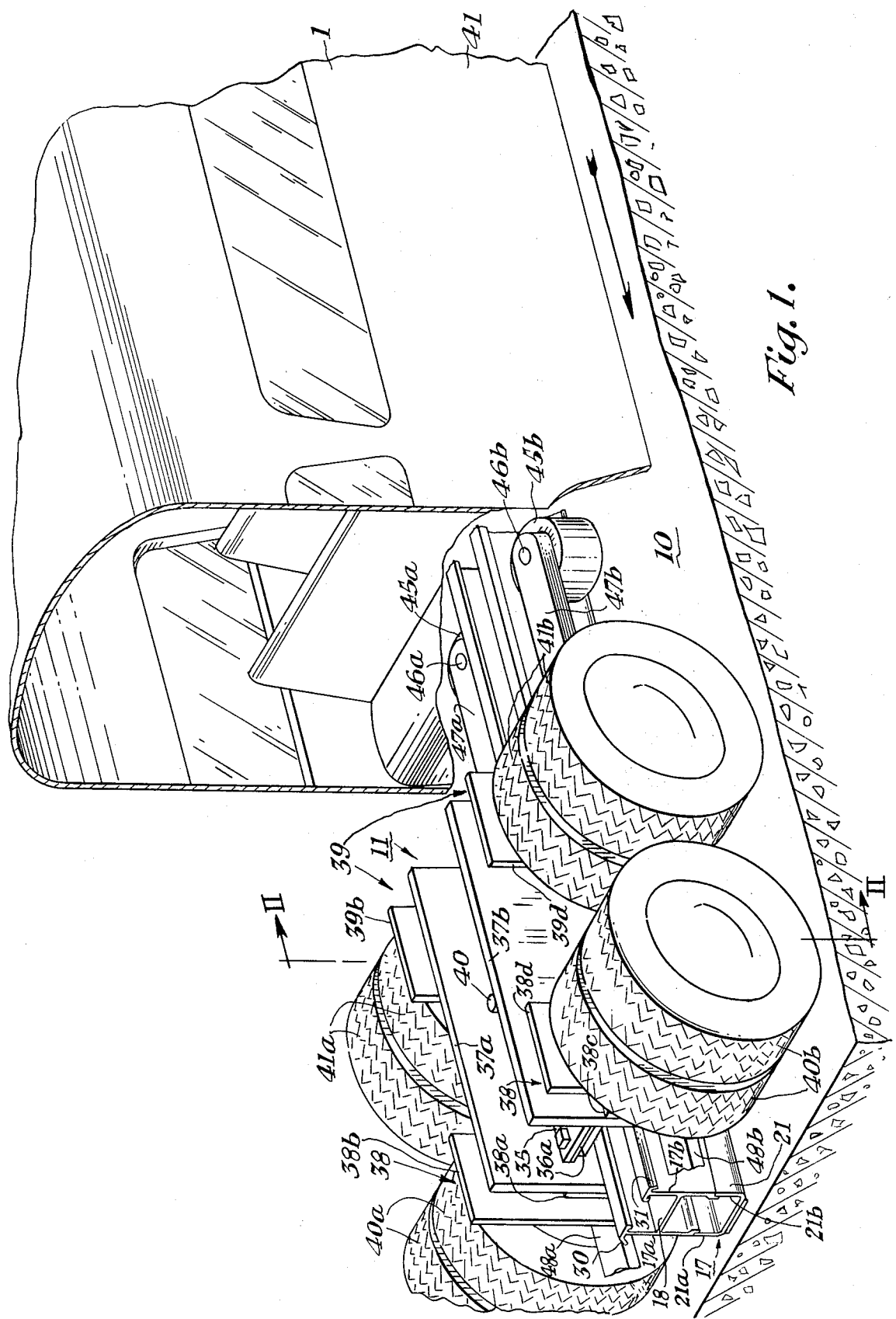
FIG. 1 is a perspective view of a portion of a monobeam transportation system constructed in accordance with the principles of the present invention.

Referring now to the drawings and, in particular, to FIG. 1, there is shown a preferred embodiment of the present invention with the body of the monobeam vehicle 1 broken away to more clearly illustrate the cooperative association between the trackway or roadway and, in this instance, the front truck of the monobeam vehicle. As shown, the horizontal surface of the monobeam trackway or roadway 10, namely, the base of the elongated roadway, is fabricated of reinforced concrete. Thus, the upper surface or top of the base 10 constitutes a horizontal running surface which is adapted to accommodate and to be contacted by the rubber tired wheels of the vehicle, as will be described hereinafter. Centrally dividing and effectively straddling the middle of the base 10 is a prefabricated metal guide beam 17. The guide beam 17 is preferably H-shaped in cross section and includes a pair of opposed vertical surfaces 17a and 17b which are adapted to be engaged by the guide wheels of the monobeam vehicle, as will be described hereinafter. The vertical portions 17a and 17b of the elongated H-shaped monobeam are reinforced by a horizontal cross strap 18 which is located substantially midway between the upper and lower extremities of the structure. As shown particularly in FIGS. 2 and 3, the lower extremities of the elongated guide beam or the lower legs of the H-shaped cross section structure are at selected points suitably fitted and firmly secured to a U-shaped channel member 21. That is, the upstanding legs 21a and 21b of member 21 are bolted to each of the inturned edges or extremities of the lower legs 17a and 17b of the H-shaped beam structure at optimum locations along the length of the elongated beam. In viewing FIGS. 2 and 3, it will be noted that the bight or base section of the channel member 21 is securely fastened to the upper surface of the base member of the trackway by tie bolt 24 and nut, lock washer 25 and 26, respectively. Thus, the beam is suitably supported at selected intervals to provide an effectively rigid and highly stable elongated guiding member 17.

Figure 2:
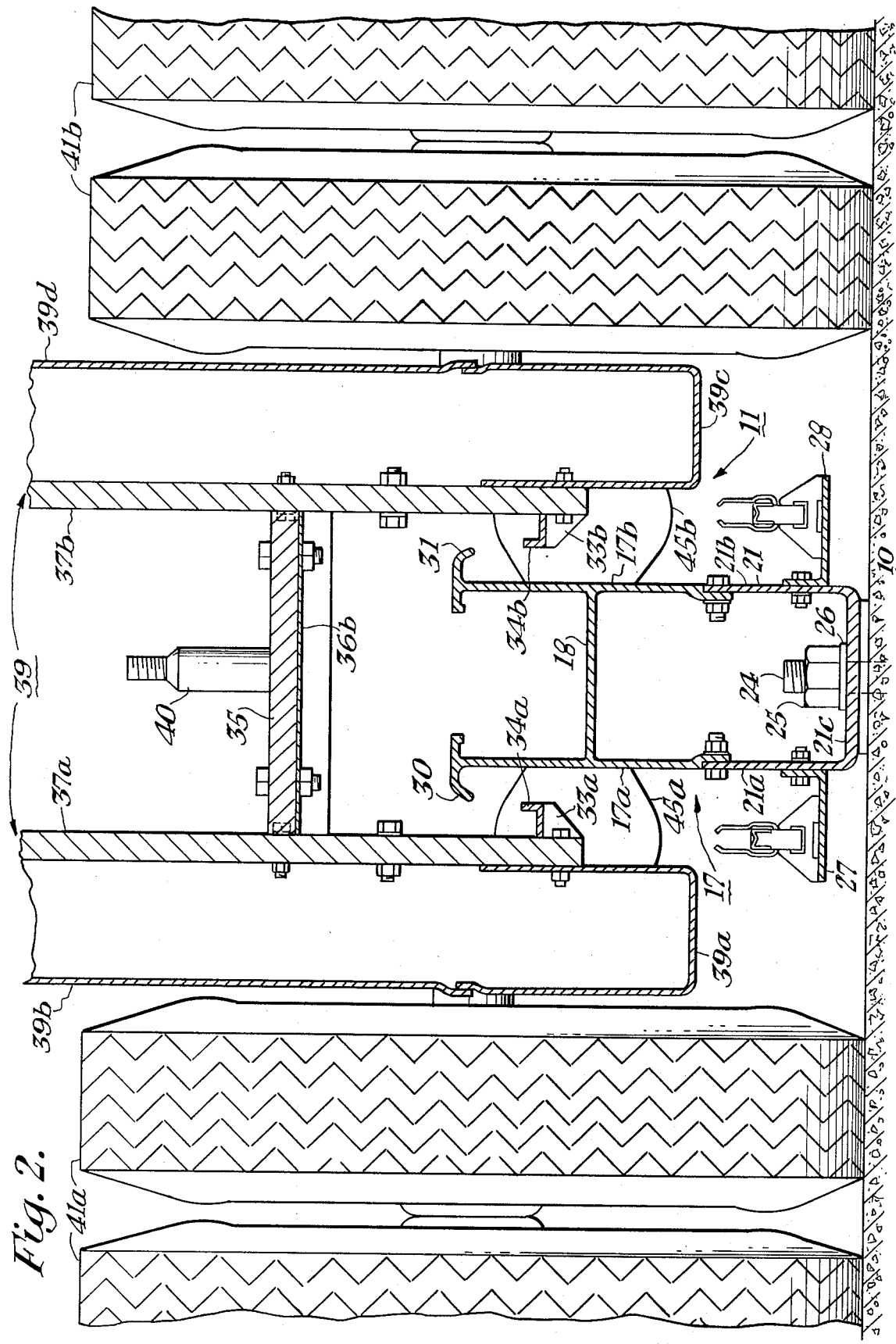
FIG. 2 is an enlarged cross sectional view taken along line II—II of FIG. 1 illustrating the position of the truck assembly of the vehicle as it normally runs along the roadway.

It will be noted from FIGS. 2 and 3, that lateral flanges 28 may be bolted to the guide beam structure to provide a support for the electrical supply conductors (not characterised) which furnish energy or power to the electrical drive motors which propel the monobeam vehicle along its route of travel. As shown, the upper extremities or edges of each of the two legs of the H-shaped guide beam 17 include an inverted furrow or, in othe words, an upstanding downwardly turned flange portion. That is, the upper left-hand leg of the H-shaped beam structure 17 includes a continuous inverted furrow 30 while the right-hand leg of the beam member 17 includes a continuous inverted furrow 31, the purpose of which will be described in detail hereinafter.

Generally, each monobeam vehicle 1 includes at least two bogies, namely, a front and a rear truck or axle assembly. Both the front and rear trucks perform the necessary supporting and guiding functions that permit the monobeam vehicles to readily move along their routes of travel. Since each of the truck assemblies is substantially indentical in construction, it is therefore only necessary to describe in detail the front truct 11. The front truck assembly 11 comprises a horizontal tie plate 35 which is suitably bolted to a pair of front and back L-shaped angle members 36a, 36b, respectively. The horizontal tie plate 35 and angle members 36a and 36b are suitably attached to two vertical side plate members 37a and 37b, respectively. As shown in FIG. 1, the truck assembly includes two pairs of front and rear axle frames 38 and 39. The left and right front axle frames 38 are fabricated from suitable channel and plate members. For example, in viewing FIGS. 2 and 3, it will be noted the left rear axle frame 39 includes the back portion of the relatively thick side plate member 37a in which its lower edge is bolted to the inner upstanding leg of a U-shaped channel member 39a. The upper extremity of the outer leg of the U-shaped channel member 39a may be lap welded to an outer plate 39b of the left rear axle assembly. As shown, the right rear axle assembly is made up of the rear portion of plate member 37b, a U-shaped channel member 39c, and an outer plate 39d. Similarly, the left and right rear axle frames 39 are constructed from appropriate channel and plate members. As shown in FIG. 1, the left front axle assembly 38 is made up of the front portion of the tie plate 37a, a U-shaped channel member (not shown) and an outer plate 38b. Likewise, the right front axle assembly 38 is made up of the front portion of the tie plate 37b, a U-shaped channel member (not shown) and an outer vertical plate member 38d. Thus, the axle assemblies together provide a sturdy structure for the weight of the monobeam vehicle. The tie plate 35 is provided with an upstanding threaded pivot stud 40 for providing a suitable pivotal connection between the truck assembly 11 and the car chassis or body 41, thereby allowing a horizontal pivoting action therebetween.

It will be noted that truck assembly 11 includes four dual rubber tired supporting wheels, as shown in FIG. 1. In viewing the oncoming vehicle 1 of FIG. 1, it can be seen that the left front frame has an axle which is equipped with a pair of dual pneumatic rubber tired wheels 40a, while the right front frame 38b has an axle which carries the dual rubber tired wheels 40b. As shown in greater detail in FIGS. 2 and 3, the truck assembly 11 including the left rear frame 39a carries a pair of dual rubber tired wheels 41a, while the right rear frame has an axle which rotatably supports a pair of dual running wheels 41b. In addition to the four groups of running wheels, each of the truck axle assemblies includes four guide wheels which are adapted to straddle the central guide beam 17. In the present instance the guide wheels are adapted to rotate in a horizontal plane. The four guide wheels function in a dual manner, namely, a front pair and a rear pair, of which only the rear pair is shown in the drawings. Guide wheels 45a and 45b are journaled about vertical shafts or axles 46a and 46b, respectively. The vertical shafts 46a and 46b are suitably mounted and carried at outer extremities of guide wheel frame members 47a and 47b, respectively. The inner extremities or end portions of the frame members 47a and 47b are pivotally secured to the main structure of the truck assembly 11. The front pair of guide wheels (not shown) may be pivotally mounted to the outer extremity of the guide wheel frames 48a and 48b which, in turn, are securely fastened to the main structure of the truck assembly 11. The pneumatic supporting tires of the truck assemblies are normally divided into a driving and driven pair of wheels. With the vehicle normally traveling in the direction as illustrated by the arrow in FIG. 1, the front pair of dual wheels 40a and 40b would be driven by the second pair of dual driving wheels 41a and 41b. That is, the tractive effort for propelling the vehicles along the trackway 10 is conveyed to the axles of the drive wheels 41a and 41b. In practice, the rear driving wheels 41a and 41b are coupled through a silent type of chain drive and a differential box to a d.c. electric motor (not shown). The d.c. power supplied to the drive motor is supplied by the previously mentioned electrical conductors which are connected to the central guide beam 17.

The monobeam vehicle is retarded or braked through means of an air over hydraulic braking arrangement which is mechanically coupled to the axles of the driven wheels 40a and 40b, respectively. The pneumatic guide wheels of each of the truck assemblies steer the vehicle along its path of travel so that they smoothly and evenly negotiate curves, banks, and the grades that are usually present on the roadway 10.

As shown in FIGS. 2 and 3, the inner plate members 37a and 37b, which rigidly interconnect the front axle frame 38 and the rear axle frame 39, extend below the top of the central beam 17. It will be seen that there is mounted on the inner, lower surface of the vertical side plate 37 a restraining bracket 33a and similarly mounted on the inner surface of the inside vertical tie plate 37 is a restraining bracket 33b. The restraining brackets 33a and 33b are securely bolted preferably at or near the center line of side plates 37a and 37b, respectively. The inner upper extremities of the restraining brackets 33a and 33b are formed into hook portions 34a and 34b, respectively. In viewing FIG. 2, it will be noted that the hook portions are in substantial overlapping relationship but out of contact with the continuous inverted furrows 30 and 31 which are formed on the upper extremities of the H-shaped guide beam 17.

Let us now assume that the vehicle 1 is proceeding along its route of travel on the trackway 10 and that no excessive lateral pressures are being exerted on the vehicle. Under this condition the monobeam vehicle 1 will not experience any traumatic forces which tend to lift and tilt the vehicle off its running wheels. Thus, the monobeam vehicle will be guided by the guide wheels and will move along its route of travel in a normal manner. Hence, the trucks of the vehicle 11 should assume an ideal position with respect to the roadway 10, which is illustrated in FIG. 2. As shown in FIG. 2, the vehicle supporting running wheels ride squarely on the upper surface of the base 10 and the guide wheels 45a and 45b engage the vertical surfaces 17a and 17b, respectively. The restraining or entrapping brackets 33a and 33b remain below and clear of the inverted furrows 30 and 31, respectively, so that the monobeam vehicle smoothly moves along its route of travel.

However, let us now assume that the monobeam vehicle 1 is exposed to and experiencing excessive lateral forces which causes the lifting of one side of the vehicle off the base 10 and thereby tends to derail the vehicle. As shown in FIG. 3, the right-hand running wheels 41b are lifted off the upper surface of the base 10 so that the entire vehicle is tilted by the lateral forces and would normally be derailed and overturned resulting in excessive damage and possible injury to passengers and operating personnel. As shown in FIG. 3, the vehicle is restrained by the engagement of the hook portion 34b of the restraining bracket 33b with the inverted furrow 31. Thus, the vehicle 1 is entrapped and securely held on the trackway when excessive centrifugal forces or high velocity cross winds tend to lift and derail the vehicles as they move along their route of travel. Thus, the vehicle is prevented from leaving the roadway or being derailed by the entrapping action of either of the restraining brackets and the inverted furrows. It may be advisable to provide a lubricant vehicle on the engaging surface of the hook portions 34a and 34b in order to reduce the frictional wear when engagement takes place with the inverted furrows. After cessation of the excessive lateral forces from the vehicle, the monobeam vehicle 1 returns to its normal running position, as shown in FIG. 2. Thus, the presently described entrapment arrangement prevents derailment of the monobeam vehicles even under the most adverse conditions, namely, high velocity cross winds and excessive centrifugal forces when the vehicle negotiates a curve at higher than normal speeds.

Although my invention has been described with reference to a single embodiment thereof, it should be understood that numerous other embodiments and changes and numerous variations, alterations, and modifications may be made by those skilled in the art that fall within the spirit and scope of my invention. Therefore, it is understood that my invention is not limited to the exact details shown and described herein but it is to be accorded the full scope and protection of the appended claims.

Having thus described my invention, what I claim is:

1. A transportation system comprising,
   an elongated roadway having a horizontal surface for supporting vehicles and a pair of substantially vertical opposing surfaces for guiding the vehicles as they move along their route of travel,
   at least one vehicle having a pair of laterally spaced vertical side plates that straddle said pair of substantially vertical opposing surfaces for guiding the vehicles,
   each of said pair of substantially vertical opposing surfaces having a furrow extending the length of said elongated roadway,
   a restraining bracket located on each of the vertical side plates of the vehicles, said brackets each having a hook portion that is downwardly spaced from the furrow that it opposes whereby when the vehicles are free of lateral forces or have limited lateral forces directed against one of their sides, the respective furrow and hook portions remain spaced apart from each other and whereby when a lateral force of a greater amount is directed against one of the sides of the vehicle causing the vehicle to tilt and attempt to leave the roadway, one of the pairs of opposing furrow and hook portions will become engaged thus preventing the vehicle from leaving the roadway, and
   said vehicles having running tires mounted thereon that ride on the horizontal surface of the elongated roadway and said vehicles also having guide wheels that cooperate with said substantially vertical opposing surfaces.

2. A transportation system as defined in claim 1, wherein said pair of substantially vertical opposing surfaces are the vertical sides of a centrally located guide beam.

3. A transportation system as defined in claim 1, wherein said furrow is integrally formed on the top edge of each of said pair of substantially vertical opposing surfaces.

4. A transportation system as defined in claim 1, wherein said substantially vertical opposing surfaces are the side members of an extruded H-beam member.

5. A transportation system as defined in claim 1, wherein said pair of substantially vertical opposing surfaces and said furrow are integrally constructed from a metallic material by an extrusion process.

* * * * *